United States Patent

Sugiyama et al.

[11] Patent Number: 5,992,874
[45] Date of Patent: Nov. 30, 1999

[54] AIRBAG MODULE

[75] Inventors: Toshiyuki Sugiyama; Michitaka Suzuki; Kazuyoshi Nishijima; Kazuhiro Kaneko, all of Shizuoka, Japan

[73] Assignee: Nihon Plast Co., Ltd., Fuji, Japan

[21] Appl. No.: 08/921,262

[22] Filed: Aug. 29, 1997

[30] Foreign Application Priority Data

Aug. 30, 1996 [JP] Japan ................................. 8-230799

[51] Int. Cl.⁶ ........................... B60R 21/20; B60R 21/26
[52] U.S. Cl. ..................... 280/728.2; 280/731; 280/740
[58] Field of Search ............................ 280/728.2, 728.3, 280/731, 740, 736, 743.1

[56] References Cited

U.S. PATENT DOCUMENTS

| | | | |
|---|---|---|---|
| 3,819,205 | 6/1974 | Dunford et al. | 280/731 |
| 4,913,461 | 4/1990 | Cuevas | 280/731 |
| 5,013,064 | 5/1991 | Miller et al. | 280/731 |
| 5,577,766 | 11/1996 | Niwa et al. | 280/731 |

FOREIGN PATENT DOCUMENTS

| | | | |
|---|---|---|---|
| 3-182855 | 8/1991 | Japan | 280/736 |
| 6-312643 | 11/1994 | Japan . | |
| 7-40838 | 2/1995 | Japan . | |

*Primary Examiner*—Peter C. English
*Attorney, Agent, or Firm*—Foley & Lardner

[57] ABSTRACT

An airbag module mounted on a boss section of a steering wheel of an automotive vehicle. The airbag module comprises an airbag which is inflatable and developable upon being supplied with gas. A cover is provided including a covering section for covering the airbag. A tearing line is formed at a surface of the covering section of the cover. The tearing line includes a central section having first and second ends which are opposite to each other, and first and second side sections to which the first and second ends of the central section are respectively connected. An inflator is provided having gas ejection openings through which gas is ejected. The gas ejection openings are located inside the airbag. A base member is provided such that the airbag is fixed thereto. Additionally, an opposite member is located opposite to the covering section of the cover and disposed inside the airbag. The opposite member includes a device for guiding gas from the gas ejection openings of the inflator toward first and second side sections of the tearing line of the covering section of the cover.

14 Claims, 5 Drawing Sheets

– 1 –

AIRBAG MODULE

BACKGROUND OF THE INVENTION

1. Field of the Invention

This invention relates to improvements in an airbag module including an airbag which is folded and stored inside a cover, and more particularly to the airbag module which is arranged to rapidly break or tear the cover so as to smoothly inflate and develop the airbag.

2. Description of the Prior Art

Airbag modules have been proposed and put into practical use in such a manner that one of them is installed in a boss section of a steering wheel in order to protect a driver of an automotive vehicle from impact at a vehicle collision or the like. Such an airbag module is, for example, disclosed in Japanese Patent Provisional Publication No. 6-312643 and includes an airbag whose major part is folded and located facing the driver and positioned in front of an inflator for ejecting gas. In other words, the major part of the folded airbag is located between the upper surface of the inflator and the front side of a cover for covering the airbag. The inflator, airbag and cover are secured to a base plate. With this arrangement, when a vehicle collision is detected or when a high deceleration of the vehicle over a predetermined level is detected, the inflator ejects gas to inflate the airbag thereby breaking or tearing the cover along a predetermined tear line under the pressure of expansion of the airbag. This causes the cover to open taking the shape of opened doors, so that the airbag projects through the cover and inflates and develops in front of the driver or vehicle passenger.

The airbag module of this type is usually arranged such that a horn device is switched ON by pressing the cover in order to improve the operationability of a horn switch. For example, in the arrangement of Japanese Patent Provisional Publication No. 6-312643, the whole airbag module is supported by horn plates and springs, in which the whole airbag module is moved downward by pressing the cover thereby allowing the movable contact disposed on the horn plates to come into contact with a stationary contact disposed on the side of a steering wheel main body thereby closing a switching circuit to sound the horn device.

Besides, with an arrangement disclosed in Japanese Patent Provisional Publication No. 7-40838, a diaphragm type switch is installed to the back side surface of a cover of an airbag module and covered at its back side surface with a stiff panel. When the cover is pressed by a driver, the diaphragm type switch is pressed through the cover thereby to close a switch circuit.

With the above-discussed conventional arrangements, it has been desired to rapidly break or tear the cover when gas is ejected from the inflator in order to smoothly inflate and develop the airbag. In this regard, in the arrangement of Japanese Patent Provisional Publication No. 6-312643 in which the major part of the airbag is folded and stored to be located at the side of the vehicle occupant, gas is supplied into the airbag which has been folded a plurality of times so that the inflating airbag thrusts the central section of the cover. At this time, the central section of the cover elastically deforms in a manner to bulge upwardly, and therefore it is difficult to effectively apply a breaking force to a tear line. This makes it difficult to rapidly break or tear the cover of the airbag module.

Concerning the above conventional switch arrangements in which the switch is operated by pressing the cover of the airbag module, the airbag is folded to be stored in a space having a certain volume which space is located inside the cover; however, the airbag cannot be always folded in the same condition. As a result, a hardness of the airbag in the folded state is not constant, so that a deformation amount of the airbag or a force required to deform the cover with the airbag is not constant when the cover is pressed. This makes a dispersion in depression stroke of the switch throughout many products of the airbag module thereby lowering the operationability of the switch combined with the airbag module.

BRIEF SUMMARY OF THE INVENTION

It is an object of the present invention to provide an improved airbag module which effectively overcomes drawbacks encountered in conventional airbag modules.

Another object of the present invention is to provide an improved airbag module in which a cover for an airbag can be rapidly broken and torn along its tear line thereby smoothly developing the airbag in front of a vehicle passenger or driver, while improving the operationability of a switch in case that the airbag module is provided with the switch for operating a horn device or the like.

A further object of the present invention is to provide an improved airbag module in which gas from an inflator is directed to the side sections of the tear line thereby to prevent the central part of the cover from elastically deforming in a bulging manner, in which tearing of the side sections is smoothly propagated to the central section of the tear line.

A still further object of the present invention is to provide an improved airbag module in which the major part of an airbag is folded and stored around the outer peripheral surface of a generally cup-shaped cover section for an inflator, while a minor part of the airbag is located without being folded between the upper surface of the cover section and the back side surface of the cover.

An airbag module according to the present invention comprises an airbag which is inflatable and developable upon being supplied with gas. A cover is provided including a covering section for covering the airbag. A tearing line is formed at a surface of the covering section of the cover. The tearing line includes a central section having first and second ends which are opposite to each other, and first and second side sections to which the first and second ends of the central section are respectively connected. An inflator is provided having gas ejection openings through which gas is ejected. The gas ejection openings are located inside the airbag. A base member is provided such that the airbag is fixed thereto. Additionally, an opposite member is located opposite to the covering section of the cover and disposed inside the airbag. The opposite member includes a device for guiding gas from the gas ejection openings of the inflator toward first and second side sections of the tearing line of the covering section of the cover.

With the above arrangement of the airbag module according to the present invention, the gas from the inflator is guided through the gas guiding device of the opposite member toward the side sections of the tear line formed at the surface of the covering section of the cover, in which the airbag is inflated and developed while the pressure of the airbag is concentrated to the side sections of the tear line. This suppresses the elastic deformation of the covering section of the cover (made of, for example, a soft thermoplastic resin) thereby rapidly breaking or tearing the covering section and accordingly smoothly inflating and developing the airbag so as to effectively support the vehicle occupant or driver at a vehicle collision or the like. Additionally, it is preferable to fold and store a major part of the airbag around the peripheral surface of the opposite member while a minor part of the airbag is located between the upper surface of the opposite member and the cover without being folded. This assists the above operation of the airbag and improves the operationability of a switch (for example, a horn switch) in case the switch is provided in combination with the airbag module.

DETAILED DESCRIPTION OF THE INVENTION

Figure 1:
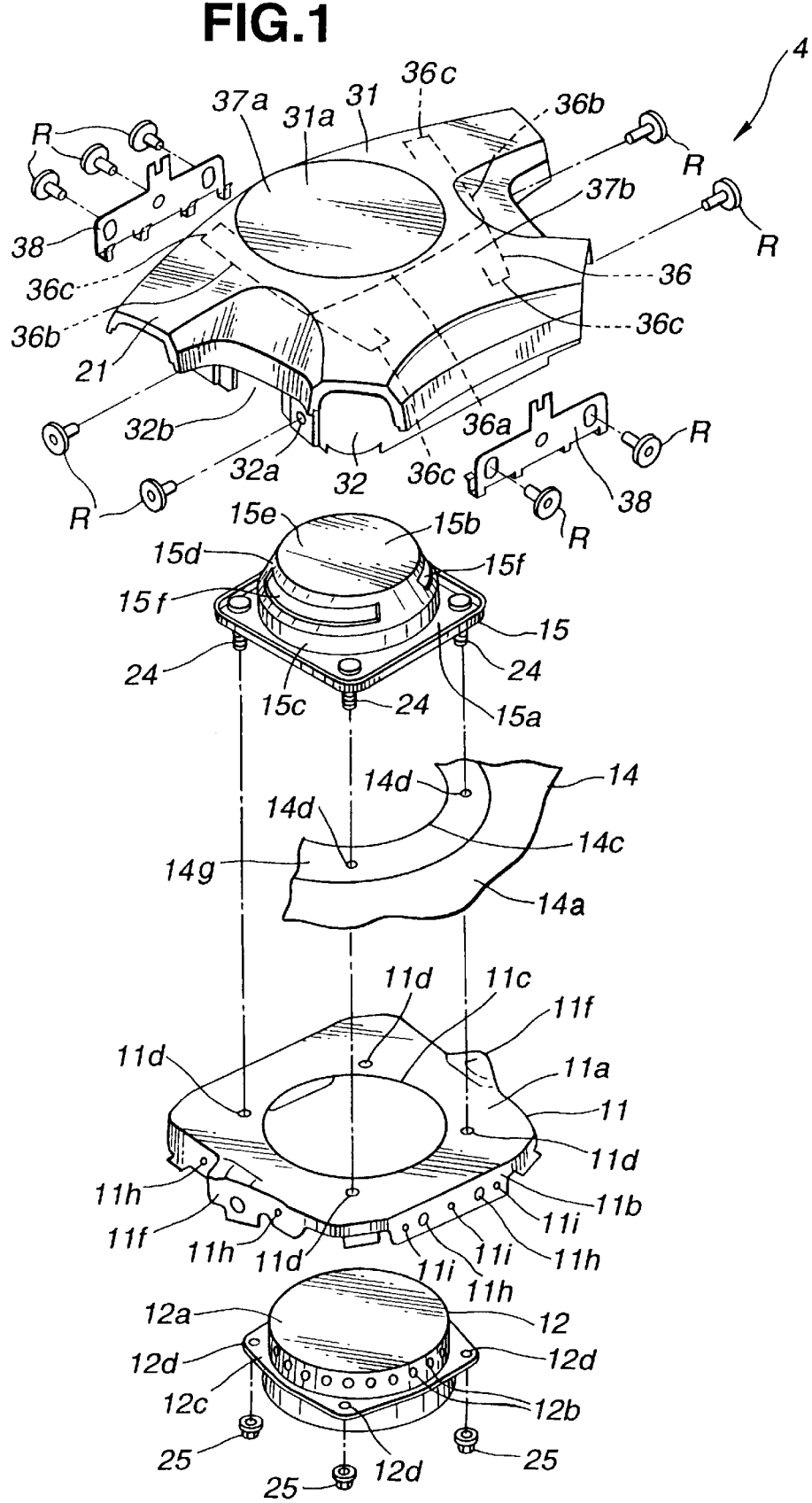
FIG. 1 is an exploded perspective view of an embodiment of an airbag module according to the present invention.
Figure 2:
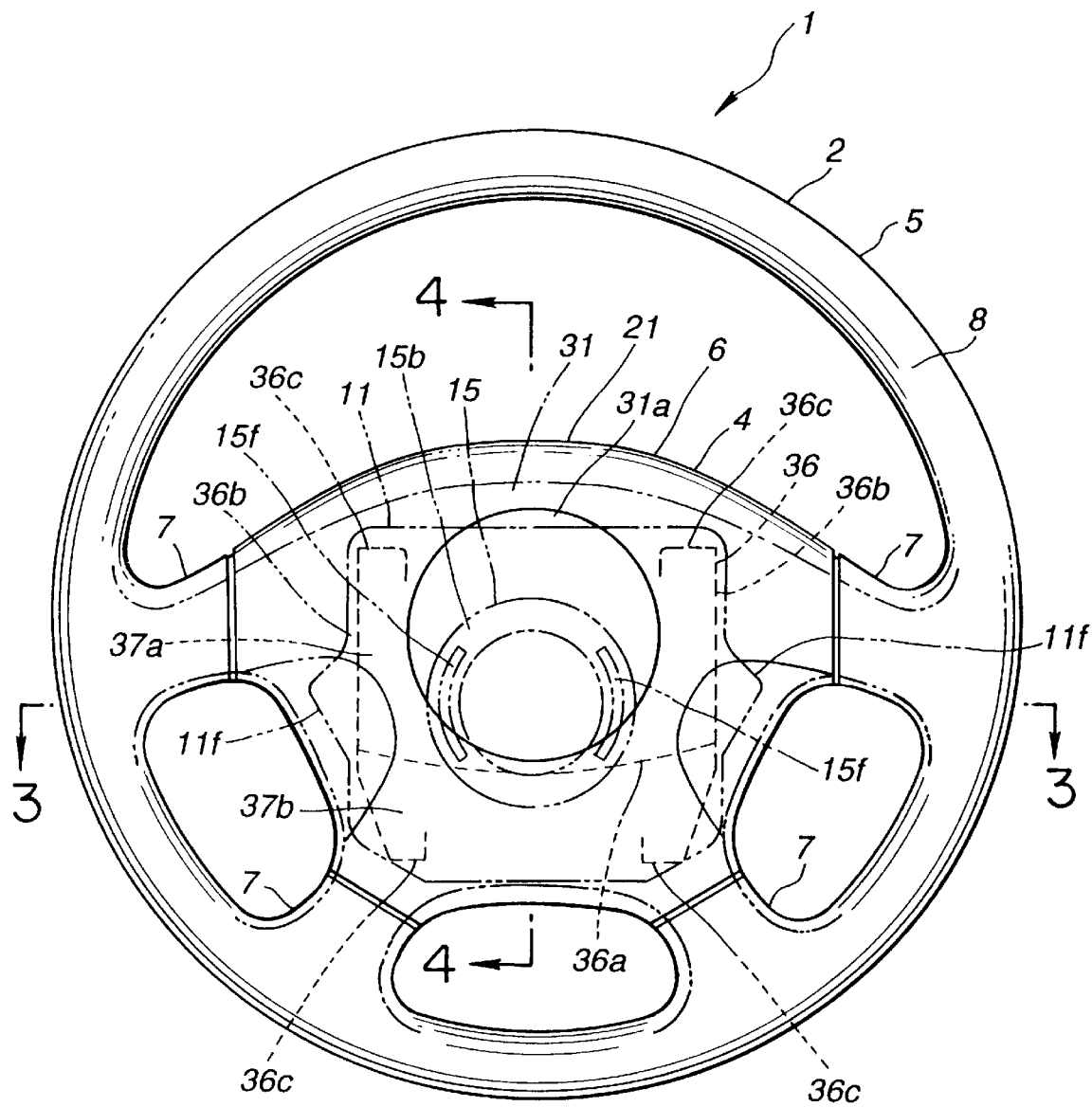
FIG. 2 is a plan view of a steering wheel having a boss section in which the airbag module of FIG. 1 is mounted.
Figure 3:
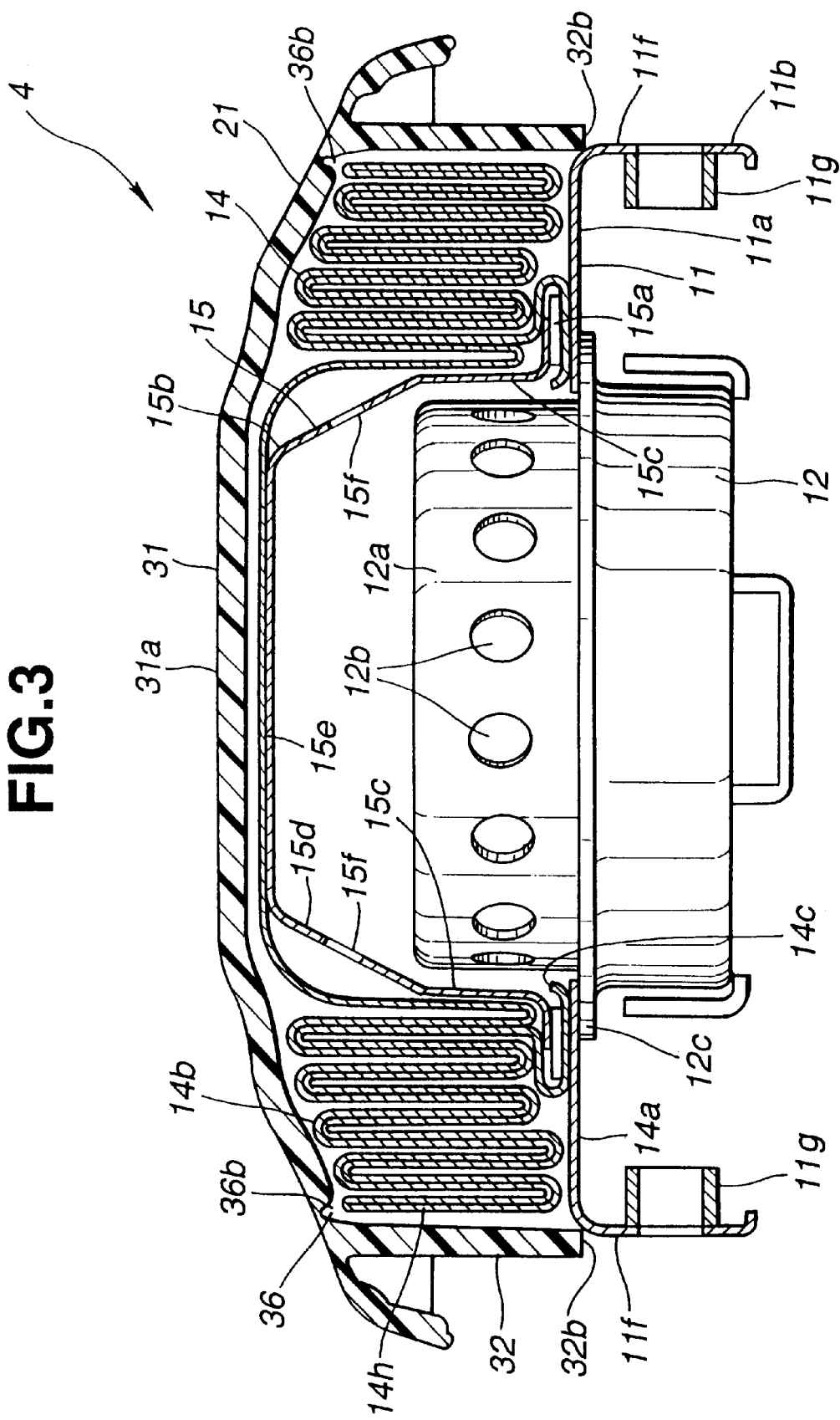
FIG. 3 is a vertical sectional view taken in the direction of arrows substantially along the line 3—3 of FIG. 2.

Referring now to FIGS. 1 to 3, an embodiment of an airbag module according to the present invention is illustrated by the reference numeral 4. The airbag module 4 forms part of an airbag restraint system which is installed to an automotive vehicle to inflate an airbag 14 automatically at any time a front-end collision occurs so as to protect a vehicle occupant or driver from coming into direct contact with either a steering wheel or a windshield. The airbag module 4 is installed to a steering wheel main body 2 of the automotive vehicle so as to constitute a steering wheel assembly 1. Explanation of the airbag module 4 will be made hereinafter on the assumption that a cover 21 of the airbag module faces the upper side or the side of the vehicle occupant or driver while an inflator 12 faces the lower side or the vehicle body lower side, although the axis of the airbag module 4 normally inclines together with the axis of the steering wheel main body 2. Additionally, it is also assumed that the front windshield (not shown) of the automotive vehicle is located at the front side while the vehicle occupant or driver is located at the rear side.

The steering wheel main body 2 includes an annular rim section 5 inside which a central boss section 6 resides. A plurality of (four in this embodiment) spoke sections 7 are formed between the rim section 5 and the boss section 6 so as to connect the rim section 5 and the boss section 6. A rigid boss (not shown) is provided below the boss section 6 so as to form part of the steering wheel main body 2, and fitted on a steering shaft (not shown). A boss plate (not shown) is integrally installed to the boss by welding or the like. This boss plate is connected to the metal core of each spoke section 7 which metal core is in turn connected to the metal core of the rim section 5. The metal core of the rim section 5 is covered with a skin layer 8 formed of soft polyurethane foam. Similarly, a part (near the rim section 5) of the metal core of each spoke section 7 is also covered with the skin 8. Horn plates (not shown) forming part of a horn switch mechanism are connected to the upper side of the boss plate in such a manner as to be vertically elastically movable relative to the base plate. The airbag module 4 is fixedly supported to these horn plates.

The airbag module 4 includes a base plate or installation member 11 to which an inflator 12, the airbag 14, a retainer 15 and the cover 21 are installed. The base plate 11 is formed by bending a steel sheet and has an upper flat section 11a of a generally rectangular shape in plan. A peripheral wall section 11b of the generally rectangular shape in section is formed integral with the upper flat section 11a and extends downward from the peripheral portion of the upper flat section 11a. The upper flat section 11a is formed with a circular inflator installation opening 11c which is located at the central part thereof. A plurality of bolt holes 11d are formed in the upper flat section and located around the inflator installation opening 11c. Two oppositely located bracket installation sections 11f are formed in the peripheral wall section 11b, in which a nut 11g (in FIG. 3) is integrally installed to each bracket installation section 11f at the inside surface. Additionally, the peripheral wall section 11b is formed with a plurality of rivet holes 11h which are located peripherally at predetermined intervals. Engagement holes 11i are formed in the front and rear portions of the peripheral wall section 11b, in which each rivet hole 11h is located between the engagement holes 11i. The bracket installation sections 11f are fixed respectively to the oppositely located horn plates under the action of bolts (not shown) each of which is screwed into the nut 11g of the bracket installation section 11f, thus fixedly installing the base plate 11 to the side of the steering wheel main body 2.

The inflator 12 includes a generally cylindrical inflator main body 12a which is formed at its upper peripheral portion with a plurality of gas ejection openings 12b which are formed radially and located at predetermined intervals. High pressure gas is to be ejected out through the gas ejection openings 12b. The inflator main body 12a is provided with a flange section 12c which extends radially outwardly from the outer peripheral surface of the inflator main body 12a. The inflator 12 is to be installed to the base plate 11 through the flange section 12c. The flange section 12c is formed with a plurality of bolt holes 12d. The inflator main body 12a includes a trigger section (such as an igniter or squib) which is located inside the inflator main body 12a and connected to a lead wire (like one 12e in FIG. 4) which is extended from the bottom side of the inflator main body 12a. Chemical pellets or propellant pellets are located around the trigger section. The chemical pellets are to start their reaction by supplying electric energy from the trigger section to the pellets thereby momentarily generating a large amount of inert gas such as nitrogen gas which is ejected through the gas ejection openings 12b.

The airbag 14 is made up of two circular base cloths (woven cloths) 14a, 14b which are put one upon the other and sewn with each other at their peripheral portions thereby to be formed into the bag-shape. The two base cloths 14a, 14b have the same peripheral profile. One of the base cloths 14a, 14b to be located below the other is formed at its central part with a circular opening 14c through which the upper-half section of the inflator 12 is to be inserted into the airbag 14. A plurality of bolt holes 14d are formed around the opening 14c. It will be understood that gas escaping slots (not shown) are formed in the airbag 14 and located separate from the opening 14c to allow gas in the airbag to escape outside the airbag. An annular reinforcing cloth 14g is located around the opening 14c and sewn with the airbag 14 to reinforce the airbag. A similar reinforcing cloth is also located around each gas escaping slot and sewn with the airbag 14 to reinforce the airbag.

The retainer 15 includes a generally annular plate section 15a. A generally cup-shaped cover section (opposite member) 15b is formed projecting upward from the plate section 15a. The plate section 15a has a peripheral profile which is rectangular and rounded at its corner portions, and defines an annular opening thereinside. The plate section 15a is formed at its flat portion with a plurality of through-holes (not shown) which are located respectively near the corner portions and positioned at equal intervals. Stud bolts 24 are respectively inserted into the through-holes from the upper side and put into such a condition as to be pendent downward, and integrally fixed in such a condition by means of caulking or welding. Nuts 25 are to be respectively engaged on the stud bolts 24.

The cover section 15b is formed integral with the plate section 15a or may be formed separate from the plate section 15a but secured to the plate section 15a. The cover section 15b includes a cylindrical portion 15c which extends upward from the plate section 15a. A generally frustoconical portion 15d is integral with the upper end of the cylindrical portion 15c and is formed such that its diameter decreases in an upward direction. A flat upper plate portion 15e is integral with the upper end of the frustoconical portion 15d and formed to close the upper end opening of the frustoconical portion 15d. It will be understood that the upper-half portion of the inflator main body 12a of the inflator 12 is stored inside the cylindrical portion 15c of the cover section 15b. Oppositely located gas guiding openings 15f of the slit-shape are formed at the wall of the frustoconical portion 15d to guide gas from the inflator 12 to right and left directions. The gas guiding openings 15f extend in a peripheral direction of cover section 15b and are located generally symmetrical with respect to the vertical plane containing the axis of the airbag module 4.

The cover (airbag cover) 21 is formed of a plastic such as soft thermoplastic elastomer, and fabricated as a one-piece body, for example, by injection molding. The cover 21 is generally in the shape of a box opened at its bottom, and includes a covering section 31 which covers the boss section 6 and a part of each spoke section 7 of the steering wheel main body 2. An installation piece section 32 is formed projecting downward from the bottom surface of the covering section 31. The covering section 31 has at its upper surface a circular flat portion 31a which is located generally at the central part of the upper surface of the covering section 31. The circular flat portion 31a serves as a pressing-operation section of the horn switch so that the horn switch is switched ON when the pressing-operation section is pressed down by a finger or the like of the vehicle occupant or driver. The upper surface of the covering section 31 is smoothly curved from the circular flat portion 31a in the forward and rearward directions and in the right and left directions so as to form gently curving surfaces which are continuous with the skin layer 8 covering the spoke sections 7.

The covering section 31 of the cover 21 is formed at its back surface with a tear line 36 which is formed in the shape of a groove at the back surface and takes a generally H-shape in plan so as to be continuous. The tear line 36 is located at a central part of the back surface of the covering section 31 which part is surrounded by the installation piece section 32. It will be understood that a linear breakable portion is formed along the tear line 36. The linear breakable portion is low in strength and readily breakable as compared with other portions of the covering section 31. The tear line 36 includes a linearly extending central section 36a whose opposite ends are connected to two linearly extending side sections 36b, 36b which are located opposite to each other and generally parallel with each other. Each side section 36b is generally perpendicular to the central section 36a. Each of the opposite ends of the central section 36a is connected to the generally central part of the side section 36b. It will be understood that the covering section 31 is broken along this tear line 36 so as to form an opening through which the airbag 14 projects toward the driver when the airbag 14 inflates, in which front and rear side door sections 37a, 37b are formed and operable respectively in the forward and rearward directions. As shown in FIG. 2, the central section 36a is formed gently curved rearward or in the direction of the driver so as to pass by the peripheral portion of the circular flat portion 31a of the covering section 31.

An end section 36c of the generally L-shape (in plan) is connected to each of the opposite ends of each side section 36b and forms part of the tear line 36. As shown in FIG. 2, each L-shaped end section 36c is located inside each side section 36b and has a straight extreme end portion (not identified) which is generally parallel with the side section 36b. The side sections 36b with the end sections 36c are located generally symmetrical with respect to a vertical plane (not shown) containing the axis of the airbag module 4 or of the steering wheel 1 so that the distance between the opposite end sections 36c is smaller than the distance between the opposite side sections 36b. The shape of each end section 36c is adapted to prevent breakage or tearing from propagating to other parts than the tear line 36 when the door sections 37a, 37b are being formed upon breakage of the covering section 31 along the tear line 36. In this embodiment, the general thickness of the covering section 31 other than the tear line 36 is about 4 mm; the groove of the tear line 36 has a depth of about 3.5 mm and a width of about 1 mm; and the bottom or upper part of the groove of the tear line 36 is generally of the cross-sectional shape of a semicircle having a radius of about 0.5 mm. The groove of the tear line 36 is formed to have the same cross-sectional shape throughout the whole length of the central section 36a, of each side section 36b and of each end section 36c.

The installation piece section 32 of the cover 21 is formed generally into the shape having a rectangular cross-section. Each of the front and rear side walls and right and left side walls of the installation piece section 32 is formed with rivet holes 32a which are to be respectively brought into coincidence with the rivet holes 11h of the peripheral wall section 11b of the base plate 11. In this embodiment, two or three rivet holes 32a are formed in each of the front, rear, right and left side walls of the installation piece section 32. The right and left side walls of the installation piece section 32 are respectively formed with cutouts 32b into which the bracket installation sections 11f, 11f of the base plate 11 are respectively to be fitted. Additionally, the front and rear side walls of the installation piece section 32 are provided at their inside surface with engagement projections (not shown) located adjacent the rivet holes 32a.

Next, an assembly process of the above airbag module 4 will be discussed hereinafter.

First, in order to install the airbag 14 to the base plate 11, the retainer 15 having the cover section 15b is inserted into the airbag 14 through the circular opening 14c. Then, the stud bolts 24 on the side of the retainer 15 are inserted respectively into the bolt holes 14d of the airbag 14, so that locating the opening 14c of the airbag 14 to the inner peripheral portion of the plate section 15a of the retainer 15 is accomplished. Subsequently, the stud bolts 24 passed through the airbag 14 are inserted respectively into the bolt holes 11d of the base plate 11 from the upper side in such a manner that the two gas guiding openings 15f are located respectively at the right and left sides as shown in FIG. 2, in which the inflator installation opening 11c of the base plate 11 is located to the opening 14c of the airbag 14.

Then, the airbag 14 is folded and radially located around the outer periphery of the generally cup-shaped cover section 15b to take generally the shape of flower petals, so that the airbag 14 is stored in a generally circular space on the generally annular upper flat section 11a of the base plate 11. A manner of folding the airbag 14 is, for example, as follows: A plurality of predetermined positions (such as four equidistant points on the circumference) are held in a condition in which the airbag 14 is spread on the upper flat section 11a of the base plate 11. Subsequently, each part of the airbag 14 between the adjacent held positions is folded in the wave-form toward the cover section 15b of the retainer 15 which cover section 15b is located at the central part of the airbag module 4. Then, a part of the airbag 14 corresponding to each held position is wound around the cover section 15b. In this state, one or three layers of the base cloths 14a, 14b resides on the upper plate portion 15e of the cover section 15b, in which other parts of the airbag 14 are folded compactly around the cover section 15b in the wave-form.

Thereafter, the cover 21 is put on the folded airbag 14 in a manner to cover the airbag 14, in which the peripheral wall section 11b is fitted inside the installation piece section 32 of the cover 21 so as to allow the airbag 14 to be stored inside the cover 21. In this state, the engagement projections (not shown) projected from the installation piece section 32 of the cover 21 are respectively fitted in the engagement holes 11i to accomplish location and temporary fixing of the cover 21 to the base plate 11. Additionally, in this state, rivets R are inserted respectively into the rivet holes 32a from the outside of the installation piece section 32 of the cover 21 by suitably using auxiliary or backup plates 38 if necessary, upon which the inserted rivets R are inserted into the rivet holes 11h of the peripheral wall section 11b of the base plate 11 and then caulked thereby fixing the installation piece section 32 of the cover 21 to the base plate 11.

Further, the inflator main body 12a of the inflator 12 is inserted into the circular opening 14c of the airbag 14 through the inflator installation opening 11c of the base plate 11 from the lower side of the base plate 11 so as to be located inside the cover section 15b of the retainer. Then, the stud bolts 24 are inserted respectively into the bolt holes 12d of the flange section 12c of the inflator 12, upon which the nuts 25 are respectively engaged on the stud bolts 24 and tightened to fix the inflator 12 to the base plate 11. In this state, the base plate 11 and the airbag 14 are put and fixed between the retainer 15 and the flange section 12c of the inflator 12. As a result, the airbag module 4 as shown in FIG. 3 is assembled.

Subsequently, the above airbag module 4 is installed to the steering wheel main body 2 in such a manner that the bracket installation sections 11f of the base plate 11 are fixed respectively to the horn plates of the steering wheel main body 2. Accordingly, when the circular flat portion 31a of the covering section 31 of the cover 21 is pressed by the finger or the like of the vehicle occupant or driver, the whole airbag module 4 is moved downward since the back surface of the circular flat portion 31a is supported through one or three layers of the base cloths 14a, 14b of the airbag 14 by the upper plate portion 15e of the cover section 15b of the retainer 15. This causes facing contacts (not shown) of the horn switch mechanism located respectively at the horn plate side and the boss plate side to be brought into contact with each other so as to sound the horn device.

In case of occurrence of a vehicle collision or the like, the igniter of the inflator 12 is actuated under the action of a signal from a collision diagnosis or triggering unit (not shown), upon which the propellant filled around the igniter is reacted thereby generating inert gas such as nitrogen gas which is ejected through the gas ejection openings 12b formed in the peripheral surface of the inflator 12. Then, this gas is passed through the two gas guiding openings 15f formed in the generally frustoconical wall of the frustoconical section 15d of the cover section 15b of the retainer 15, and supplied into the airbag 14.

Under this condition, the major part of the airbag 14 is located and folded around the outer peripheral surface of the cover section 15b of the retainer 15. In other words, the folded section (folded in the wave-form) 14h shown in FIG. 3 is located between the cover section 15b of the retainer 15 and the installation piece section 32, whereas such a folded section does not reside above the cover section 15b of the retainer 15 so that only one or three layers (in a generally flat state) of the base cloths 14a, 14b resides above the cover section 15b of the retainer 15. It will be understood that the folded base cloths 14a, 14b in the folded section 14h can be largely developed to expand the folded section 14h of the airbag 14, whereas the central section of the base cloths 14a, 14b located on the cover section 15b of the retainer 15 is hardly developable. As a result, the outer peripheral section of the folded airbag 14 has a tendency to rapidly inflate while the central section of the folded airbag 14 cannot largely inflate also under the effect that the central section is subjected to tension due to inflation of the outer peripheral section. Thus, inflation of the airbag 14 is promoted at the peripheral section of the folded airbag 14 as compared with the central section of the folded airbag 14.

In this condition, gas ejected through the gas ejection openings 12b of the inflator 12 is guided by the inner wall of the cover section 15b of the retainer 15 and ejected through the gas guiding openings 15f formed at the inclined wall of the frustoconical portion 15d of the retainer cover section 15b, in which gas is directed to the both side sections 36b of the tear line 36. Consequently, the inflating sections of the airbag 14 are brought into press contact with the both side sections 36b of the tear line 36. In other words, pressure of the inflating airbag 14 is applied to the both side sections 36b of the tear line 36.

Thus, in this embodiment, the covering section 31 of the cover 21 is first torn or broken along the both side sections 36b of the tear line 36 under the pressure of inflation of the airbag 14. This tearing of the cover section 31 is propagated to the respective end sections 36c of the tear line 36 and simultaneously to the central section 36a, so that the covering section 31 of the cover 21 is torn or broken along the generally H-shaped tear line 36 to form the front and rear side door sections 37a, 37b which are openable. These door sections 37a, 37b turn respectively in the forward and rearward directions thereby to form an opening through which the airbag 14 projects and develops toward the vehicle occupant or driver. The airbag 14 projected in front of the driver can soften impact to be applied to the driver at the vehicle collision or the like.

In this embodiment, the covering section 31 of the cover 21 can be smoothly torn or broken along the tear line 36 thereby rapidly opening the door sections 37a, 37b, as compared with a conventional airbag module arrangement having a generally H-shaped tear line in which tearing is propagated successively from the central section (36a) to the side sections (36b) and further to the end sections (36c). This suppresses a forward projection of the airbag 14 and allows the airbag 14 to rapidly and smoothly inflate in a radially outward direction, thus improving the inflating and developing characteristics of the airbag 14 so as to effectively soften impact to be applied to the vehicle occupant or driver.

The retainer 15 includes the cover section 15b which supports the backside surface of the cover 21 through the one or three layers of the base cloths 14a, 14b, and therefore the covering section 31 can be prevented from being irregularly deformed owing to many layers of the base cloths, thereby improving operationability and operational reliability of the horn switch. The retainer 15 is integral with the cover section 15b, and therefore the number of component parts and the number of steps in an assembly step can be prevented from increasing thereby lowering a production cost.

While the whole airbag module 4 has been shown and described as being supported vertically movably by the horn switch mechanism in the above embodiment, it will be appreciated that the horn switch mechanism may take a variety of arrangements in which, for example, the horn switch mechanism is disposed in the spoke section, independently from the airbag module; the horn switch mechanism of a flat shape (such as diaphragm type or thin sheet type) is used; and the horn switch mechanism is disposed together with the cover 21 as a single member or disposed between the cover and the stored airbag 14.

Figure 4:
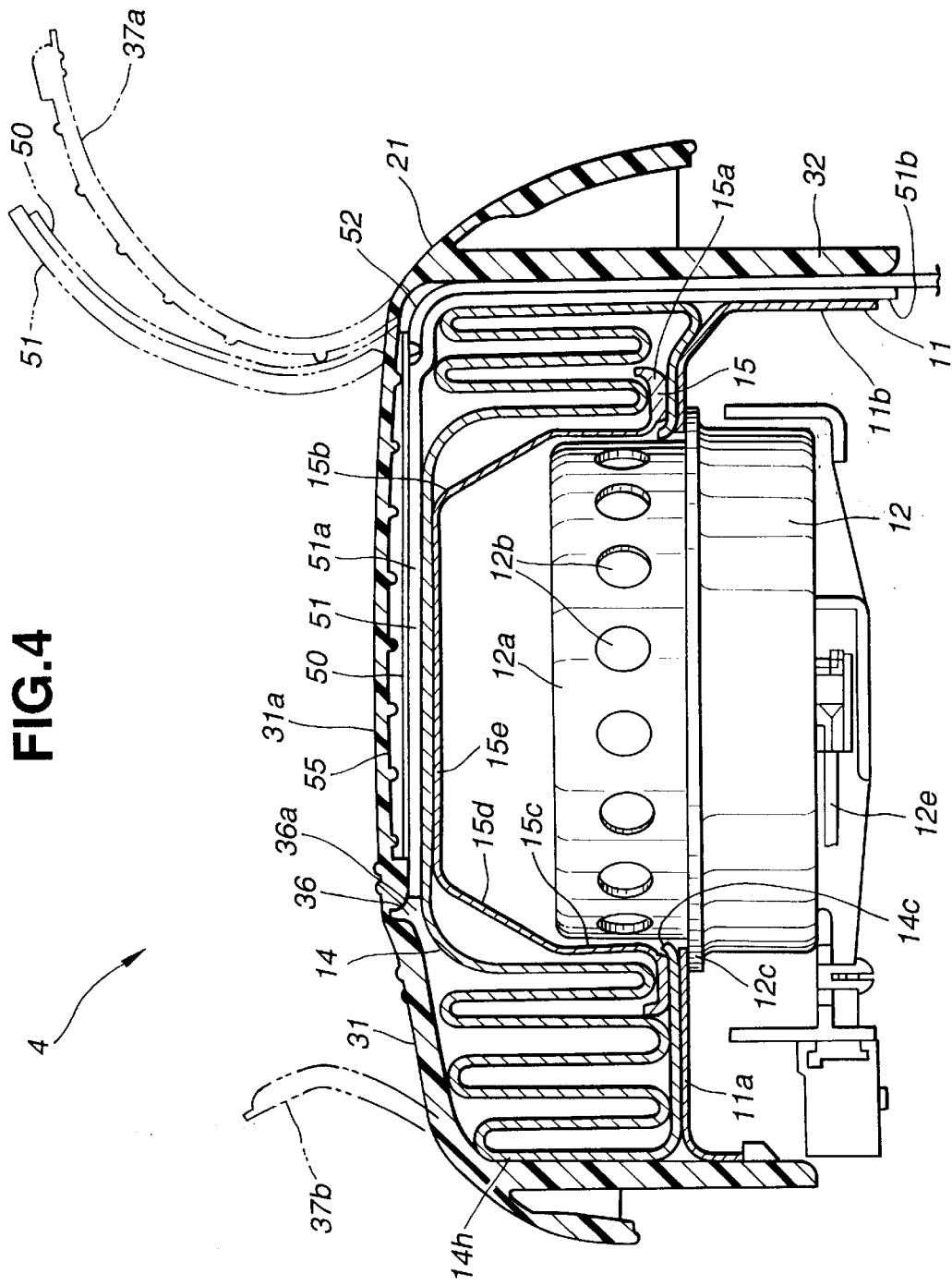
FIG. 4 is a vertical sectional view of a modified example of the embodiment of the airbag module of FIG. 1, corresponding to that taken in the direction of arrows substantially along the line 4—4 of FIG. 2.

In connection with the above, FIG. 4 illustrates a modified example of the embodiment of FIGS. 1 to 3. In this example, a backup plate 51 provided with a membrane switch 50 as a planar switch is disposed facing the back side surface of the circular flat portion 31a of the covering section 31 of the cover 21. The membrane switch 50 includes a switch body which is elastically deformable or flexible and the type of a generally elliptical (in plan) thin diaphragm, such as a sheet type, a plate type or flat type. The switch body includes a pair of polyester resin films or sheets which are laminated to each other and made of polyethylene terephthalate (PET) or the like. Electrically conductive films such as copper foils are respectively attached to the facing surfaces of the sheets. Additionally, a spacer (formed of silicone rubber or the like) is disposed deformable upon compression, between the electrically conductive films, in which the spacer includes a plurality of members which are arranged dot-like at predetermined intervals. Accordingly, the electrically conductive films are separate from each other when no force is applied to the switch body, and brought into contact with each other to close a switch circuit of the switch body when the switch body is pressed. Lead wires 52 are respectively connected through terminal portions (not identified) to the electrically conductive films. These lead wires 52 are connected through a wire harness (not shown) to a cable reel device (such as a clock spring device) or a slip ring device, by which the membrane switch 50 is connected to the horn device (not shown) disposed at the vehicle body side.

The backup plate 51 is formed of a plastic and includes a switch supporting section 51a of the generally elliptical shape in plan. An extended section 51b is formed extending from the switch supporting section 51a and formed integral with the switch supporting section 51a. The hardness of the backup plate 51 is generally equal to or higher than that of the covering section 31 of the cover 21. The switch supporting section 51a is formed at its upper surface with supporting ribs (not shown) to which the switch body is fitted to be supported. The extended section 51b is extended downward together with the lead wires 52 along the installation piece section 32, and fixed to the base plate 11.

The front side door section 37a is formed at its back side surface with a switch-disposing section 55 which is of a thin wall structure and has a plurality of projections which protrude downward.

The switch supporting section 51a (provided with the membrane switch 50) of the backup plate 51 is disposed between the circular flat portion 31a of the cover 21 and about one layer of the base cloth of the airbag 14 which is put on the upper plate portion 15e of the retainer 15. Additionally, the extended section 51b of the backup plate 51 is fixed between the peripheral wall section 11b of the base plate 11 and the installation piece section 32 of the cover 21.

With the airbag module 4 shown in FIG. 4, when the covering section 31 of the cover 21 is pressed by the finger or the like of the vehicle occupant or driver, the covering section 31 is curved downward to make its elastic deformation, in which the projections at the back side surface of the covering section 31 press the upper surface of the membrane switch 50 whose back side surface is supported by the upper plate portion 15e of the cover section 15b, through the backup plate 51 and the about one layer of the base cloth 14b of the airbag 14. As a result, the membrane switch 50 is deformed to be compressed, so that the electrically conductive films which face each other are brought into contact with each other thereby closing the switch circuit so as to cause the horn device to make sound.

When gas is ejected from the inflator 12, the gas is guided through the gas guiding openings 15f toward the side sections 36b of the tear line 36 thereby breaking and opening the covering section 31 of the cover 21 in a similar manner to that of the embodiment of FIGS. 1 to 3. At this time, the front and rear side door sections 37a, 37b turn respectively forward and rearward, accompanying forward turning of the backup plate 51 with the membrane switch 50 as indicated in phantom in FIG. 4, thus forming the opening through which the airbag 14 projects outward of the cover 21. The projected airbag 14 is inflated and developed in front of the vehicle occupant or driver thus softening impact to be applied to the vehicle occupant or driver.

According to this modified example, the same advantageous effects as those in the embodiment of FIGS. 1 to 3 can be obtained. Additionally, although the membrane switch 50 and the backup plate 51 are provided, a bulging deformation of the central part (formed with the central section 36a of the tear line 36) of the covering section 31 of the cover 21 can be effectively suppressed when the covering section 31 is broken or torn under pressure of the inflating airbag 14, thereby rapidly breaking the covering section thus improving the development characteristics of the airbag 14. This prevents an excessive force from being applied to the membrane switch 50 which is disposed along the lower surface of the covering section 31. Also in case that the backup plate 51 is formed of a hard elastomer resin in order to facilitate receiving an operational or depression force for the horn switch, formation of the door sections 37a, 37b can be smoothly accomplished. Further, force for deforming the membrane switch 50 and the backup plate 51 can be lowered thereby lightening a baneful influence to the membrane switch 50. Furthermore, no special devising is required for the installation structure for the membrane switch 50 and the backup plate 51, thereby facilitating production of the airbag module 4 and lowering production cost of the airbag module 4.

While the membrane switch 50 has been shown and described as being supported through the backup plate 51 and the airbag 14 by the cover section 15b of the retainer 15 in the modified example of FIG. 4, it will be understood that the backup plate 51 may be omitted in which the membrane switch 50 is supported at its lower surface only through the airbag 14 by the cover section 15b of the retainer 15.

Although the gas guiding openings 15f of the cover section 15b have been shown and described as being formed slit-like in the above-described arrangements, it will be understood that a plurality of circular openings like the gas ejection openings 12b in the inflator 12 may be formed in place of the gas guiding openings 15f, in which a series of the circular openings are located near and facing each side section 36b of the tear line 36.

Figure 5:
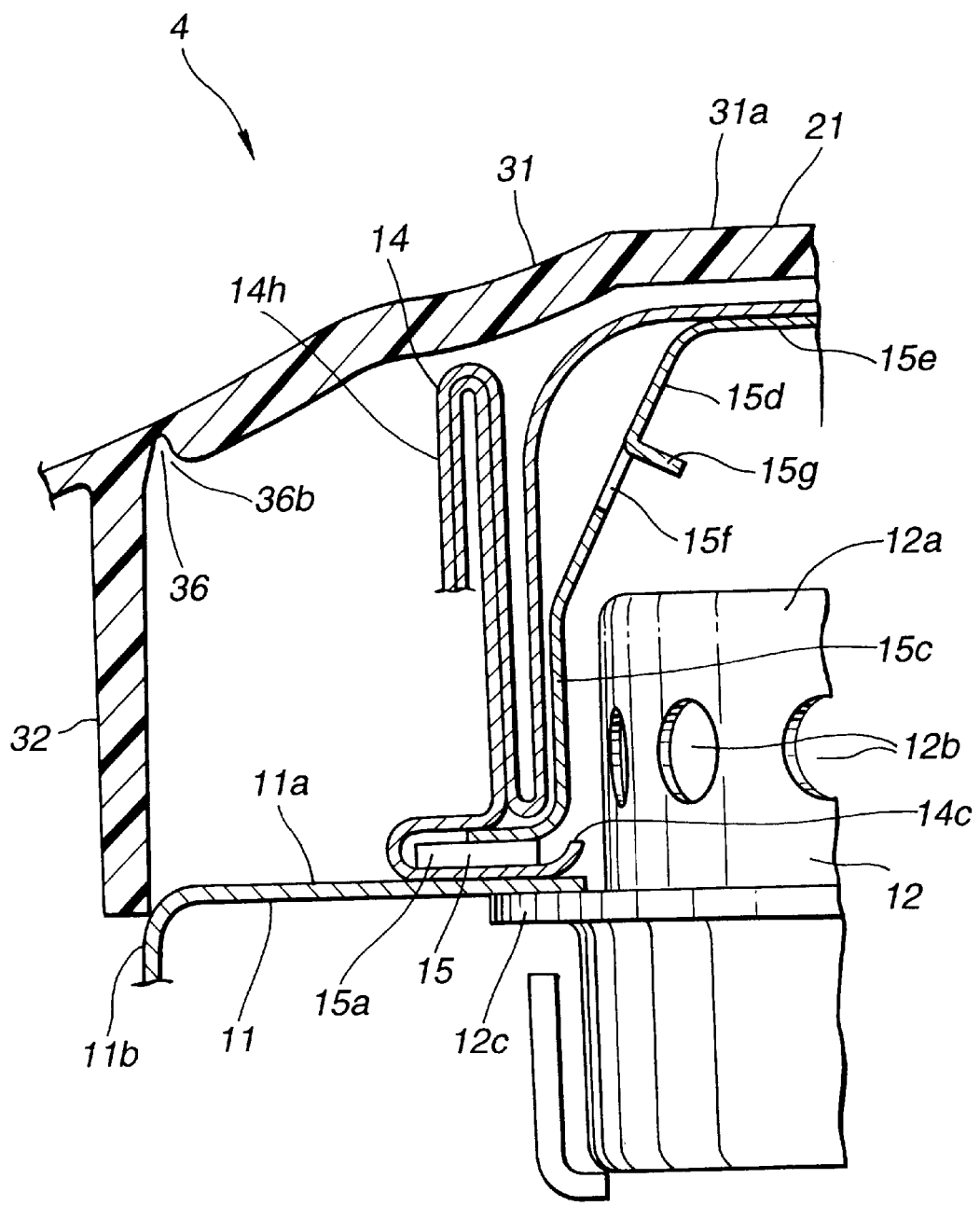
FIG. 5 is a fragmentary sectional view of another modified example of the embodiment of the airbag module of FIG. 1.

The gas ejection openings 15f may be formed by cutting the wall of the frustoconical section 15d generally in the shape of a tongue and bending the cut part inward to form a deflector plate 15g for effectively guiding gas from the inflator 12 toward each side section 36b of the tear line 36 in the covering section 31 of the cover 21 as shown in FIG. 5.

Additionally, while the cover section 15b for covering the upper section of the inflator 12 has been shown and described as being formed integral with the retainer 15 for fixing the airbag 14 to the base plate 11 in the above-discussed arrangements, it will be understood that the cover section 15b may be formed separate from the retainer 15 or may be formed integral with the inflator 12, the base plate 11 or the like other than the retainer 15 in order to intend reduction of the number of component parts and lowering production cost of the airbag module 4.

Furthermore, the major part of the airbag 14 has been shown and described as being located around the peripheral surface of the generally cup-shaped cover section 15b taking generally the shape of flower petals, it will be appreciated that one or two rows of folded parts of the airbag 14 may be formed around the cover section 15b while several layers of the base cloths 14a, 14b of the airbag 14 may be located on the cover section 15b.

What is claimed is:

1. An airbag module comprising:
   an airbag inflatable and developable with gas;
   a cover including a covering section, said cover covering said airbag;
   a tear line at a surface of said covering section of said cover, said tear line including a central section having first and second ends, which are opposite to each other, and first and second side sections extending respectively from the first and second ends of said central section;
   an inflator having gas ejection openings through which gas is ejected, said gas ejection openings being located inside said airbag;
   a base member to which said airbag is fixed; and
   an opposite member located opposite to the covering section of said cover and disposed inside said airbag, said opposite member including guides that guide gas from the gas ejection openings of said inflator toward the first and second side sections of said tear line of said covering section of said cover,
   wherein the gas guides direct gas to the first and second side sections of said tear line during inflation of said airbag so that said cover is first torn along said first and second side sections of said tear line.

2. An airbag module as claimed in claim 1, wherein said opposite member is a generally cup-shaped cover section for covering the gas ejection openings of said inflator and facing the covering section of said cover, said cover section being connected to the base member and including a generally frustoconical portion through which gas guiding openings are formed, gas from the gas ejection openings of said inflator being guided through said gas guiding openings toward the first and second side sections of said tear line of said covering section of said cover.

3. An airbag module as claimed in claim 2, wherein said gas guiding openings of said cover section include first and second guiding openings which are located near and inside said first and second side sections of said tear line, each of said first and second guiding openings extending in a peripheral direction of said cover section and located generally symmetrical with respect to a vertical plane containing an axis of said airbag module.

4. An airbag module as claimed in claim 3, wherein said first and second guiding openings are located between said gas ejection openings of said inflator and said tear line of said cover in an axial direction of said airbag module.

5. An airbag module as claimed in claim 2, wherein said cover section is formed integral with a retainer for fixedly retaining said airbag to said base member.

6. An airbag module as claimed in claim 2, wherein a major part of said airbag is located in a folded state around said cover section and between said base member and said covering section of said cover, a minor part of said airbag being disposed in a planar state between said cover section and said covering section of said cover.

7. An airbag module as claimed in claim 6, wherein said major part of said airbag is folded in a wave form around a peripheral surface of said cover section such that a substantial portion of a surface of said airbag is disposed substantially perpendicular to a plane defined by said base member.

8. An airbag module as claimed in claim 2, further comprising:
   a front side door section and a rear side door section coupled to said tear line, said front and rear door sections are openable and turn respectively in forward and rearward directions to form an opening through which said airbag projects and develops toward an occupant of a vehicle upon inflation of said airbag.

9. An airbag module as claimed in claim 1, wherein said first and second side sections of said tear line are generally parallel with each other, wherein said central section of said tear line is generally perpendicular to said first and second side sections, said central section being disposed to a generally central position of each of said first and second side sections.

10. An airbag module as claimed in claim 1, further comprising a planar switch fixed to the covering section of said cover, said switch being adapted to be switched ON upon said covering section of said cover being pressed downwardly.

11. An airbag module as claimed in claim 1, wherein said covering section of said cover is formed of a soft thermoplastic resin.

12. An airbag module as claimed in claim 1, wherein said cover forms part of a boss section of a steering wheel of an automotive vehicle.

13. An airbag module comprising:
    an airbag inflatable and developable with gas;
    a cover including a covering section, said cover covering said airbag;
    a tear line at a surface of said covering section of said cover, said tear line including a central section having first and second ends, which are opposite to each other, and first and second side sections extending respectively from the first and second ends of said central section;

an inflator having gas ejection openings through which gas is ejected, said gas ejection openings being located inside said airbag;

a base member to which said airbag is fixed;

an opposite member located opposite to the covering section of said cover and disposed inside said airbag, said opposite member including guides that guide gas from the gas ejection openings of said inflator toward the first and second side sections of said tear line of said covering section of said cover, wherein said opposite member comprises a generally cup-shaped cover section that covers the gas ejection openings of said inflator and facing the covering section of said cover, said cover section being connected to the base member and including a generally frustoconical portion through which gas guiding openings are formed, gas from the gas ejection openings of said inflator being guided through said gas guiding openings toward the first and second side sections of said tear line of said covering section of said cover, and wherein a deflector plate corresponding to each of said gas guiding openings is formed on an interior wall of said generally frustoconical portion of said cover section, wherein said deflector plates further guide gas from said inflator toward said first and second side sections of said tear line.

14. An airbag module comprising:

an airbag inflatable and developable with gas;

a cover including a covering section, said cover covering said airbag;

a tear line at a surface of said covering section of said cover, said tear line including a central section having first and second ends, which are opposite to each other, and first and second side sections extending respectively from the first and second ends of said central section;

an inflator having gas ejection openings through which gas is ejected, said gas ejection openings being located inside said airbag;

a base member to which said airbag is fixed; and an opposite member located opposite to the covering section of said cover and disposed inside said airbag, said opposite member including guides that guide gas from the gas ejection openings of said inflator toward the first and second side sections of said tear line of said covering section of said cover, wherein said opposite member comprises a generally cup-shaped cover section that covers the gas ejection openings of said inflator and faces the covering section of said cover, said cover section being connected to the base member and including a generally frustoconical portion through which gas guiding openings are formed, gas from the gas ejection openings of said inflator being guided through said gas guiding openings toward the first and second side sections of said tear line of said covering section of said cover so that said covering section of said cover is first torn along said first and second side sections of said tear line during inflation of the airbag, wherein said first and second side sections of said tear line are generally parallel with each other, wherein said central section of said tear line is generally perpendicular to said first and second side sections, said central section being connected to a generally central portion of each of said first and second side sections, wherein said gas guiding openings of said cover section include first and second guiding openings located near and inside said first and second side sections of said tear line, each of said first and second guiding openings extending in a peripheral direction of said cover section and located on opposite sides of and separate from a vertical plane, which contains an axis of said airbag module and extends generally parallel with the first and second side sections, said first and second guiding openings being generally symmetrical with respect to the vertical plane, and wherein said first and second side sections of said tear line are located on opposite sides of the vertical plane and generally symmetrical with respect to the vertical plane.

* * * * *